US008762207B2

(12) United States Patent
Kobres

(10) Patent No.: US 8,762,207 B2
(45) Date of Patent: Jun. 24, 2014

(54) APPARATUS, SYSTEM AND METHOD FOR CONTROLLING THE FLOW OF CUSTOMERS

(75) Inventor: Erick C. Kobres, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 643 days.

(21) Appl. No.: 12/723,954

(22) Filed: Mar. 15, 2010

(65) Prior Publication Data
US 2011/0225032 A1 Sep. 15, 2011

(51) Int. Cl.
G06Q 20/00 (2012.01)
G06Q 30/00 (2012.01)
G06Q 50/00 (2012.01)

(52) U.S. Cl.
USPC .............................................. 705/15; 705/16

(58) Field of Classification Search
None
See application file for complete search history.

(56) References Cited

U.S. PATENT DOCUMENTS

2004/0143512 A1* 7/2004 Sturr, Jr. .......................... 705/26
2004/0199425 A1* 10/2004 Van Luchene et al. ......... 705/15
2008/0222004 A1* 9/2008 Pollock et al. .................. 705/26

* cited by examiner

Primary Examiner — Paul Danneman
(74) Attorney, Agent, or Firm — Harden E. Stevens, III

(57) ABSTRACT

An apparatus, system and method are presented for controlling the flow of customers using self-service terminals. It is possible for self-service terminals to receive and process customer orders faster than the orders can be prepared for delivery to the customer thus causes long wait times for the customer if the condition is allowed to exist for an extended period of time. Controlling the flow of customers through the order entry process prevents the situation.

22 Claims, 5 Drawing Sheets

APPARATUS, SYSTEM AND METHOD FOR CONTROLLING THE FLOW OF CUSTOMERS

FIELD OF THE INVENTION

The present invention relates generally to self-service systems. More particularly, the invention relates to an apparatus, system and method for controlling the flow of customers using a self-service system.

BACKGROUND

Quick service restaurants are migrating from assisted service order entry to self-service order entry where the customer uses a self-service terminal or device to enter their order. Self-service terminals provide an efficient low cost alternative to employee assisted order entry. Since self-service terminals do not require a dedicated employee for each terminal, a restaurant that uses self-service terminals will typically have more terminals available for order entry than a restaurant using only assisted order entry. Having more self-service terminals causes the queue for each terminal to have fewer people and allows more orders to be entered per unit of time. Once an order (and payment) has been taking, the order is sent to the kitchen to be prepared and then to order fulfillment. The customer waits at a counter for the order to be fulfilled and presented for pickup.

Problems arise when the rate of order entry exceeds the capacity of the kitchen to prepare the ordered food in an acceptable period of time. When this situation occurs, customers move quickly through the order entry queue only to spend time waiting for their order at the counter. When the time spent by the customer waiting for the order is long, it creates a negative impression of the purchase experience. In addition, because the kitchen is attempting to operate beyond its capacity, preparation and order fulfillment mistakes increase, which causes even longer wait times, increased product waste and increased customer dissatisfaction, which damages the restaurant's brand image.

Therefore, it would be desirable to provide an apparatus, system and method for using self-service order entry without the above limitations.

SUMMARY OF THE INVENTION

Among its several aspects, the present invention recognizes a condition where a plurality of self-service terminals and in some cases assisted service terminals can, under certain circumstances, enter orders from customers at a rate that is higher than the ability to prepare and deliver the orders thus causing long wait times and a bad customer purchase experience. The invention addresses this problem, as well as others, by determining if the condition exists and when the condition is found to exist cause the self-service terminals to modify the customer order entry process so as to increase the time a customer spends at the self-service terminal. When the condition no longer exists, the modifications to the customer order entry process are removed and the customer order entry process returns to normal.

Under normal conditions, software running on the self-service terminals provides a customer order entry process that is optimized for speed and ease of use by the customer. The optimized process inputs and completes each customer order as quickly as possible to reduce the time customers wait in a queue to enter their order.

After the self-service terminal has inputted and completed a customer order, it is sent to a store server. The store server runs management software that receives the customer order and sends it an order fulfillment terminal in a preparation area where the components of the order are prepared. When all the components of the order are prepared, a notice is sent to order fulfillment terminals to assemble the order and deliver it to the customer. The management software also monitors and times the entire purchase process from taking a customer's order to delivery of the order to the customer. The individual times are used to calculate a running average. If the average total time that customers are waiting for delivery of orders exceeds a predetermined time, the management software instructs the self-service terminals to modify the optimized customer order entry process to increase the time each customer spends at a terminal engaged in entering an order or other activities. Increasing the order entry time reduces the rate at which new orders are entered and focuses the customer's attention on something other than waiting for the order to be prepared.

When instructed to increase the customer order entry time by the management software, software running on each of the self-service terminals modifies the optimized customer order entry process. The modifications include providing additional information and interactions with the customer during the customer order entry process. These modifications slow down the customer order entry process thus reducing the rate at which new orders arrive at the kitchen management terminals. This allows additional time to prepare each customer order and to reduce backlog of customer orders.

The modifications to the optimized customer order entry process further include engaging the customer after the order has been entered and sent to the kitchen management terminal for preparation. These additional interactions keeps the customer engaged so the perceived wait time does not seem as long thus improving the customer's buying experience.

The modifications made to the optimized customer order entry process are incremental in that the self-service terminal can be instructed to only make modifications that correspond to an extend level parameter. The management software determines which extend level the self-service terminals should implement based on the average total wait time customers are experiencing and will increase or decrease the extend level as needed to provide the best average total customer wait time.

A more complete understanding of the present invention, as well as further features and advantages of the invention, will be apparent from the following Detailed Description and the accompanying drawings.

DETAILED DESCRIPTION

Figure 1:
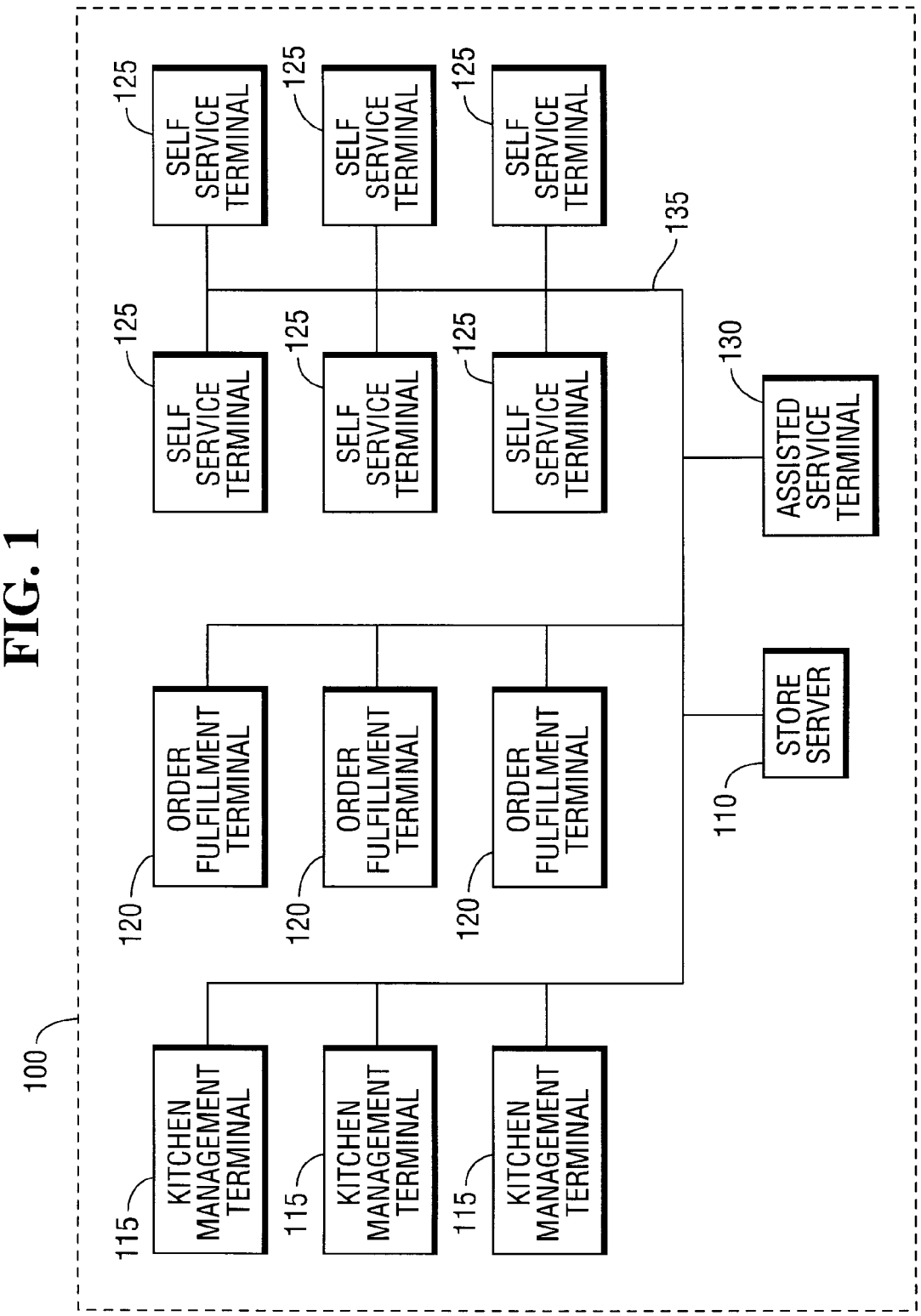
FIG. 1 is a high-level diagram illustrating an exemplar embodiment of a self-service terminal system.

With reference to FIG. 1, there is provided a high-level block diagram of an exemplar quick service food management system 100. The system 100 includes a store server 110 in communication with kitchen management terminals 115, order fulfillment terminals 120, self-service terminals 125 and an assisted service terminal 130. The store server 110 communicates with the terminals 115, 120, 125, 130 using a network 135. The network 135 can be wired or wireless. The store server 110 is a computer that runs software, which among other things monitors and controls the ordering, preparation and order fulfillment of products being offered for sale.

The self-service terminals 125 run software that interfaces with customers to enter their order and payment. The assisted service terminal 130 is operated by an employee and is used to enter a customer's order. Some embodiments have more than one assisted service terminal 130.

The software running on the store server 110 monitors and tracks each customer order and the items ordered. The kitchen management terminals 115 run software that controls and manages kitchen operations including the preparation of food. The software running on the store server 110 provides information about items ordered by the customers to the software running on the kitchen management terminals 115. The kitchen management terminals 115 then instruct kitchen personnel to prepare the ordered food items. Kitchen personnel indicate on a kitchen management terminal 115 when each food item has been prepared. The software running on the store server 110 receives the food item ready indication from the kitchen management terminal 115. When all items in an order have been prepared, the software running on the store server 110 sends instructions to the order fulfillment terminals 120. Software running on the order fulfillment terminals 120 then instructs personnel to assemble a customers order and deliver it to the customer. Once the order is delivered, an indication is entered on the order fulfillment terminal 120 indicating the order has been delivered to the customer and software running on the store server 110 is notified the order has been delivered.

When the software running on the store server 110 receives the order delivered notification, it marks the customer's order as complete and updates metrics that measure parameters associated with the customer's purchase experience. The metrics include, the time required to place the order, the time to prepare the ordered items, the time to assemble and the deliver the order to the customer (fulfillment), the time from when the order was placed until the customer received the ordered items (order wait time) and the total wait time measured from when the customer started the order entry process until the order was delivered to the customer. The software also maintains averages and moving averages for the above metrics. A moving average is calculated using data for orders placed only during a short moving period of time, such as just the last 10 minutes. The averages are then compared to target values set for each metric and a deviation from the target value is determined for each metric.

In some embodiments, order payment occurs at the order fulfillment terminals 120 or at either the self-service terminals 125, an assisted service terminal 130.

Figure 2:
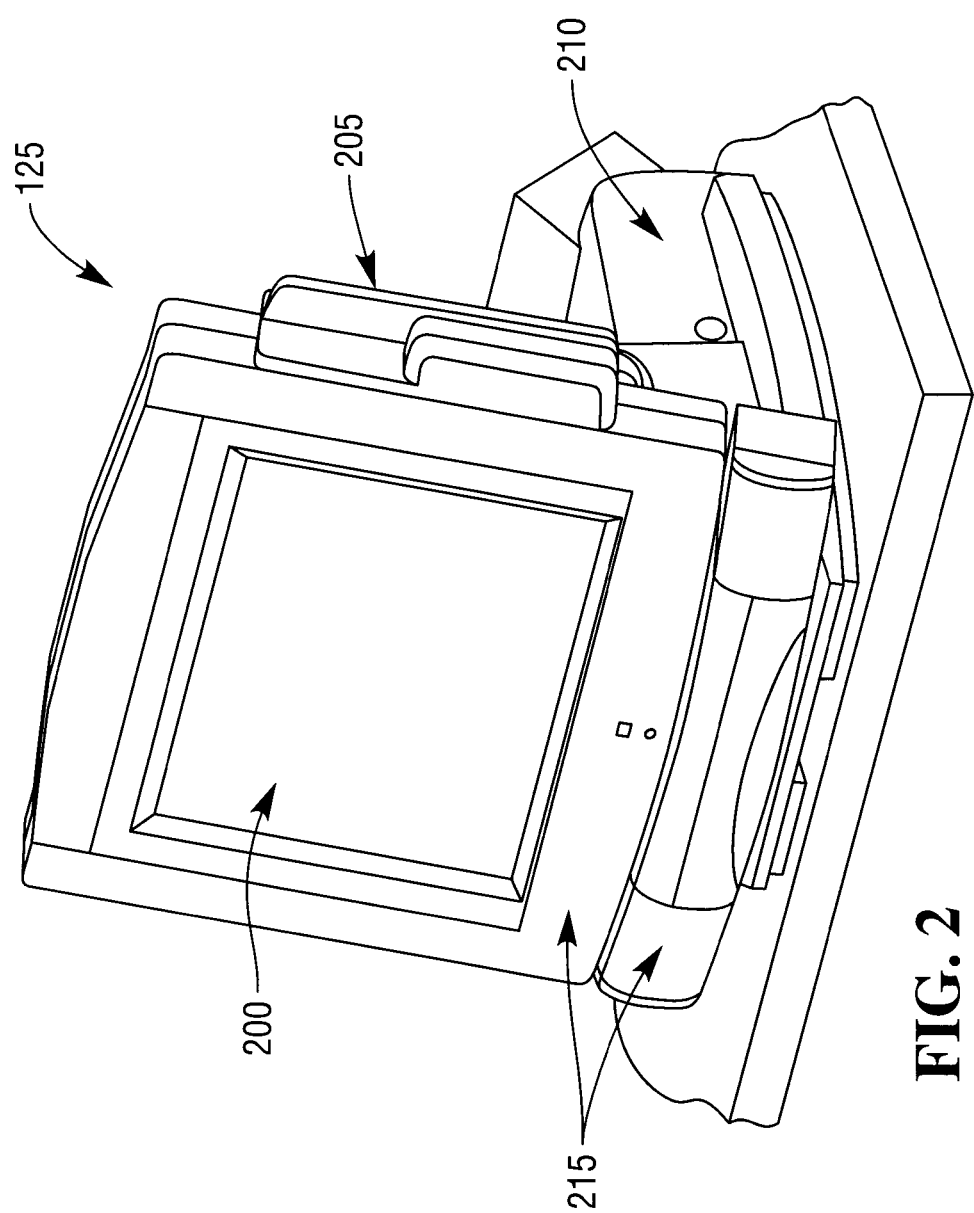
FIG. 2 is a high-level drawing depicting an exemplar self-service terminal.

Turning now to FIG. 2, there is presented an exemplar self-service terminal 125. The terminal 125 has an LCD/Touch Screen 200 and magnetic stripe reader (MSR) 205 for reading credit cards or other cards that have a magnetic stripe (e.g., customer loyalty cards or government issued identification cards). A computer 210 is housed in the base of the terminal 125. The computer 210 executes software that controls the operation of the terminal 125 and communicates with the store server 110. The software also implements the features and functions available on the terminal 125. When the terminal 125 is configured to receive payment for an order, the MSR 205 is used to read a credit card. Order and credit card information is then sent to the store server 110 for processing of the payment.

Figure 3:
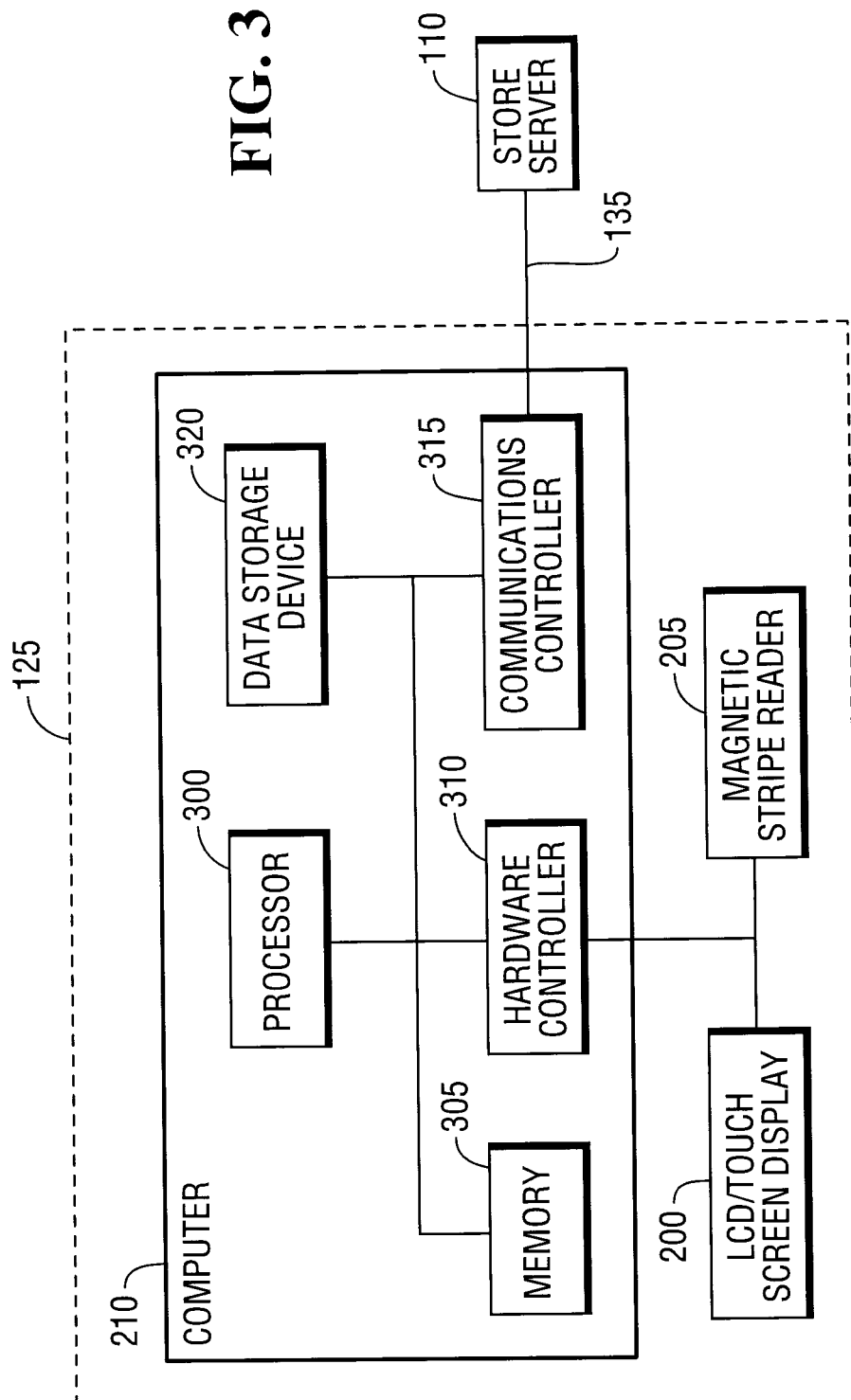
FIG. 3 is a high-level block diagram of the major components of the exemplar self-service terminal.

Referring to FIG. 3, there is provided a high-level block diagram of the exemplar self-service terminal 125. The computer 210 includes a data storage device 320 that provides non-volatile long-term storage of software and data collected or used by the terminal 125. The software includes one or more applications or programs that control the terminal 125 and implement the features and functions provided by the terminals. The data storage device 320 can be implemented using solid-state technology, rotating technology (e.g., disk drives) or a combination thereof.

The computer 210 also includes a processor 300 and a memory 305. The processor 300 moves the software and data, as needed, from the data storage device 320 to the memory 305 for execution. The software, when executed by the processor 300, controls and implements the features and functions of the terminal 125.

The computer 210 further includes a communications controller 315 and a hardware controller 310. The communications controller 315 has the hardware necessary to communicate with external computers such as the store server 110 over the network 135. The network 135 can be a wired network or a wireless network. The communications controller 315 supports multiple protocols and communicates with different computers either directly or by using the store server 110 as a proxy to other networks that are connected to the store server 110.

The hardware controller 310 provides the hardware and software to interface with and control the devices that are part of or connected to the terminal 125. This includes both internal and external devices.

The terminal 125 further comprises the LCD/Touch Screen Display 200 and the magnetic stripe reader (MSR) 205. The LCD of the display 200 is used to communicate information to a user of the terminal 125. This information can be in the form of text, graphics and video or any combination thereof. The display 200 also has a touch sensitive device attached to it that senses where it is touched. The sensed information is used by applications executing on the terminal 125, in conjunction with information displayed on the LCD, to determine a request or a response from the user. The MSR 205 reads information stored on a credit card, loyalty card or other types of card that have information stored on a magnetic stripe.

Based on a number of different parameters and conditions including the time of day, number of self-service order terminals 125 in use and number of kitchen personnel, it is possible for the self-service order terminals 125 to enter and complete customer's orders at a rate that is faster than kitchen personnel can prepare the ordered items. If this continues for a period of time, it causes long wait times for customers, which leads to a bad purchase experience for the customers. Continued bad purchase experiences will typically cause customers to not return causing the restaurant to fail.

Studies have shown that it is possible to alter the customer's perceived wait time by keeping the customer positively engaged instead of focused on just waiting for the order to be delivered. While keeping the customer engaged will improve the customer's perceived purchase experience, it does not address the cause of the long wait time which usually is that the kitchen personnel cannot prepare the food as fast the customers are ordering it. A solution must therefore refocus the customer in a positive way while also reducing the workload per period of time on the kitchen personnel.

Extending the normal time a customer spends at the order placement terminal 125 addresses both the customer's perceived wait time experience and reduces the workload per unit of time on the kitchen personnel. In the context of a customer using a self-service terminal 125, the term placing an order or the order entry process, includes the entry of items that make up the order but also includes activities that occur after the order has been taken and sent to the kitchen.

Normally, the standard customer order entry process is optimized for speed to allow the customer to quickly enter his/her order. However, the standard customer order entry process can be dynamically modified so that it takes longer for the customer to enter an order (this includes the total time a customer spends at the self-service terminal 125, some of which occurs after the order is received and transferred to the kitchen). Adding one or more of the following options to the process will extend the time a customer spends in the order entry process. These options include: 1) adding relevant video clips at different points in the order process to show or describe special promotions and/or new items on the menu, 2) adding additional options that the customer must select, 3) adding an offer for a discount coupon, and 4) enrolling the customer in a loyalty program or allowing the customer to check information if already enrolled. Each of the options adds a level of delay to the overall order entry process. A maximum level of delay would cause all options to be included. The lowest level of delay would involve only one of the options.

Some of the options extend the time required to actually take the customer's order and thus reduces the workload on the kitchen because the presentation of new customer orders to the kitchen is delayed by some period of time. Some of the options will further engage the customer after the actual order has been entered and sent to the kitchen. For example, enrolling the customer in a loyalty program or allowing the customer to check information about their loyalty account occurs after the order has been taken and keeps the customer engaged after the order has been sent to the kitchen to be prepared. Offering a discount coupon for a future visit or showing a video clip of a future promotion also keeps the customer engaged. Keeping the customer engaged and focused on these features during the order preparation time reduces the customer's perceived wait time and helps to prevent a bad purchase experience for the customer. In addition, the customer may regard the information received during this time as valuable and it may bring the customer back sooner to take advantage of the future promotion or discount coupon.

The above described options employed to increase the time a customer spends at the self-server terminal 125 are implemented when software running on the store server 110 determines the kitchen is not preparing food at a rate that keeps up with the orders being placed. The software determines this condition by comparing certain order related metrics, such as the moving average for the total wait time, to predetermined limits. The predetermined limits are set so that corrective action is taken before the customer wait times become too long and causes problems for the customers. In some embodiments, the metrics also include rates of change for the averages, which are used in conjunction with the predetermined limits to predict that a problem condition is about to occur and implement the above options to prevent the condition from occurring.

In some embodiments, the software running on the store server 110 will increase the level of delay for the customer order entry process by causing one option at a time to be inserted into the customer order entry process and then determine over a period of time if that increased level of delay was sufficient to reduce the order related metrics such as total customer wait time. If the order metrics fail to show a proper response, the level of delay is increased by inserting additional options into the customer order entry process until the order metrics show the proper response or until all options have been inserted into the process. When the order metrics go below or approach the predetermined limits, the software running on the store server 110 will cause the options to be removed from the customer order entry process so that the order entry process and times return to normal. If multiple options have been inserted into the order entry process, they are removed one by one over a period of time. However, the removal is stopped if the order metrics indicate a problem in which case, options maybe reinserted as needed. The above-described options can be tailored to a specific restaurant or created for a chain of restaurants.

In some embodiments, the order entry process of an assisted service terminal 130 is also modified to take longer than normal. The employee operating the terminal 130 is prompted to ask the customer additional questions about the order or offer the customer a special promotional option. The employee may also be instructed to ask if the customer is a member of the loyalty program. If not, the customer may choose to use a self-service terminal 125 to enroll or the employee maybe able to do it at the assisted service terminal 130.

Figure 4:
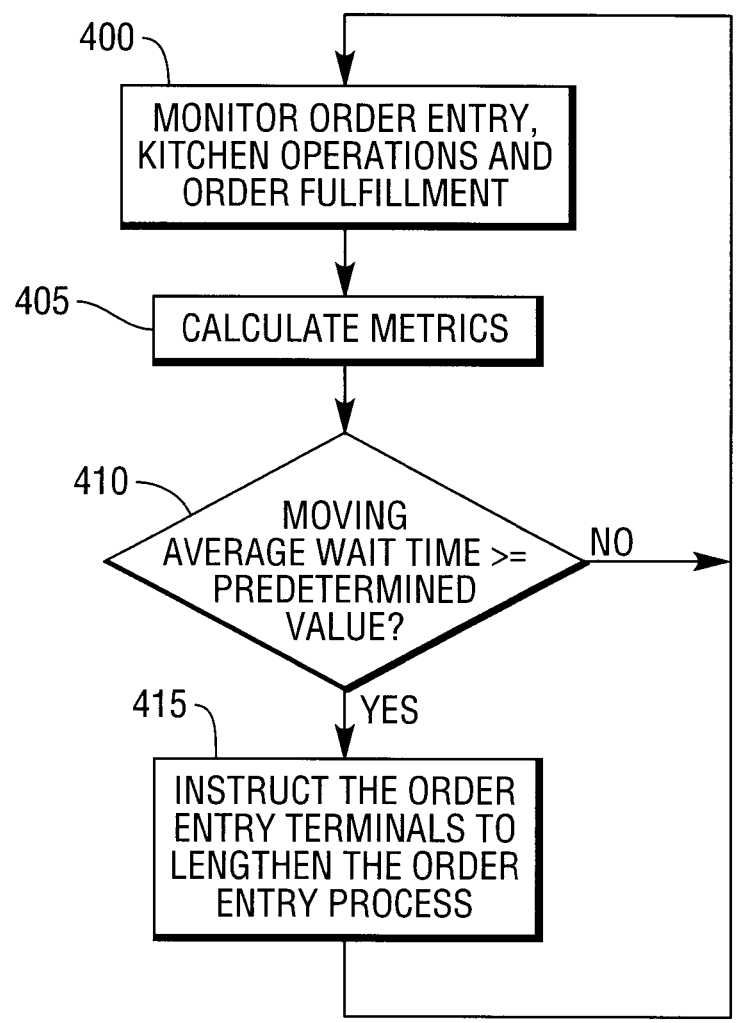
FIG. 4 is a high-level flow chart depicting an exemplary method of managing a quick service restaurant.

Referring to FIG. 4, there is provided a high-level flow chart depicting an exemplary method of managing a quick service restaurant. In step 400, software running on the store server 110 continuously monitors the operations of the quick service restaurant. This includes monitoring orders being entered on the self-service terminals 125 and the assisted service terminal 130, food preparation controlled by the kitchen management terminals 115 and order deliver controlled by the order fulfillment terminals 120.

In step 405, the software calculates a number of metrics based on the operations being monitored. The metrics include averaged time to enter an order, average time a customer waits for delivery of the order after completing the order entry process, average time required for the kitchen to prepare the order and average total time measured from the start of the order entry process to the delivery of the order to the customer. The software also calculates moving averages for these metrics.

In step 410, the software compares the moving average wait time for customers after they enter their order to a predetermined value. If the moving average wait time is less than the predetermined value, control is transfers to step 400 and the software continues to monitor all store operations. If the moving average wait time is greater than or equal to the predetermined value, control proceeds to step 415.

In step 415, the software sends instructions to lengthen the order entry process to all order entry terminals. These include the self-server terminals 125 and assisted service terminals 130.

The self-service terminals 125 execute several types of programs. These programs perform functions such as communicating with the store server 110 to send and receive data and commands. An example of a command received from the store server 110 is a command or request to slow down the customer order entry process by inserting additional steps into the standard customer order entry process. Another example of a command received from the store server 110 is a command to return to the standard customer order entry process. Other programs control the self-service terminal 125 and create the user interface that allows a user to enter a customer order or perform other functions e.g., enrolling in a customer loyalty program.

Figure 5:
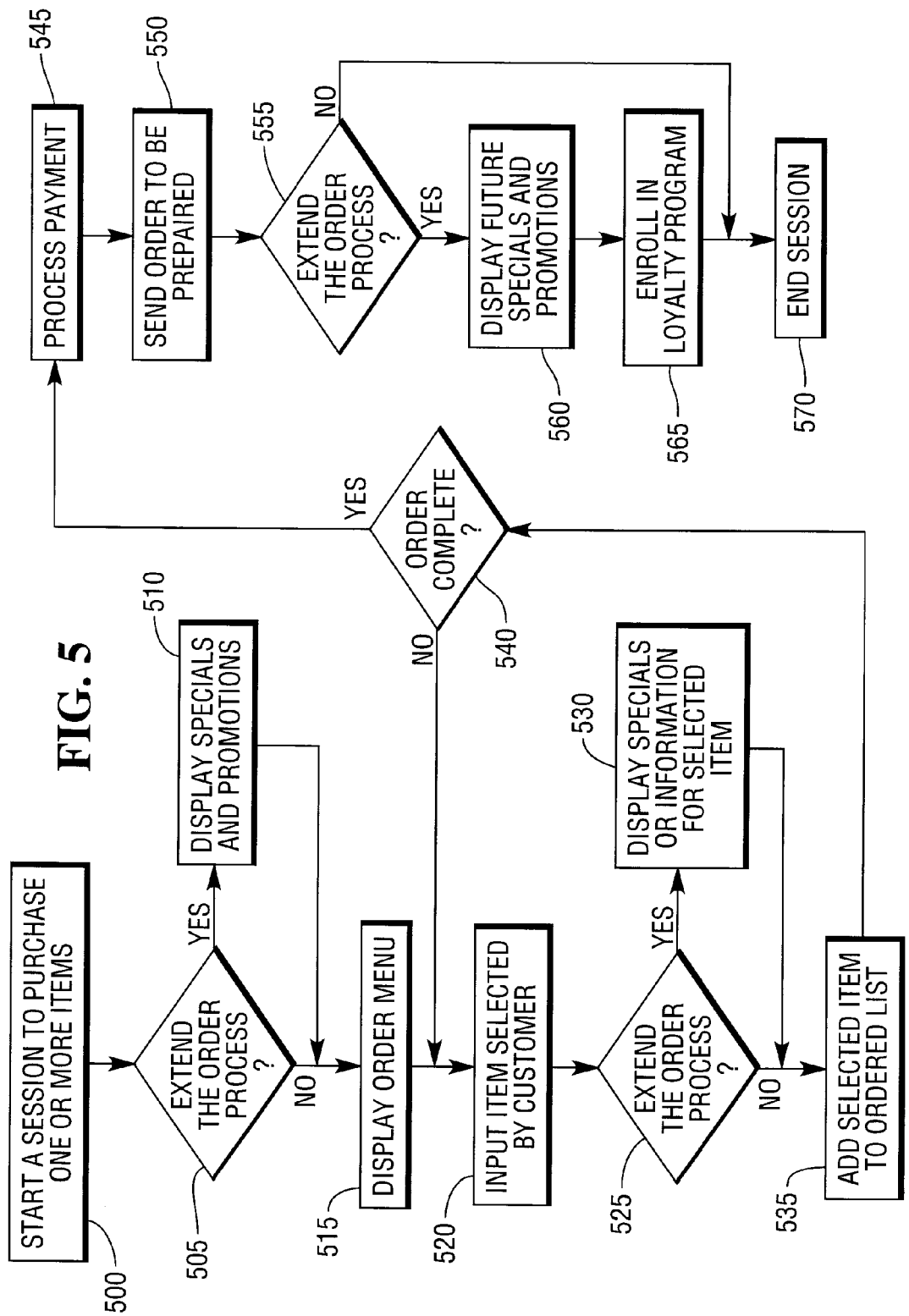
FIG. 5 is a high-level flow chart depicting an exemplary method for increasing the time required to enter a customer order.

Turning to FIG. 5, there is provided a high-level flow chart depicting an exemplary method implemented by the self-service terminals 125 for increasing the time required to enter an order. The process depicted in FIG. 5 is implemented by software being executed by the processor 300 on the self-service terminal 125.

The act of a customer touching the LCD/Touch screen 200 of the self-service terminal 125 causes the software to start a session where the customer enters an order for one or more items (Step 500). When the store server 110 sends a command to the self-service terminals 125 to extend the customer order entry process, a local parameter on each terminal 125 is updated to reflect that a command has been received. When the store server 110 sends a command to stop the extension of the customer order entry process, the local parameter in each terminal 125 is updated to reflect that command. At step 505, a test is made to determine if the standard customer order entry process should be extended. If it is determined that the standard customer order entry process should be extended, one or more special offers on products or promotions are displayed on the LCD/Touch screen 200 and the customer is allowed to make selections (step 510). For example, a special or promotion includes a reduced price on an item, a buy one and get a reduced price on a second one, combination specials or promotions based on dietary elements i.e., low fat, low calories or vegetarian. One or more of these can be presented to the customer depending on how much of an extension to the customer order entry process is requested.

After the specials and promotions are displayed or if no extension to the order process has been requested, the terminal 125 displays an order menu so the customer can start selecting one or more items for purchase (step 515). The customer uses the LCD/Touch screen 200 to select an item on the order menu (step 520). Another test is made to determine if the standard customer order entry process should be extended (step 525). If the customer order entry process is to be extended, information or specials related to the selected item are displayed (step 530). The information includes, for example, a reminder of what other items would qualify along with the selected item or items to make a combination order and receive a discount or calorie information for the item or items selected. The calorie information allows the customer to track the total calories for an order as the order is entered. If the customer has a target maximum calorie count for the order, this feature allows the customer to better select the items needed to stay below the target calorie count. The information also includes cross-product promotions and up-sell promotions. Presenting this information occupies the customer for a while lengthening the order entry time but it also provides value to the customer. In some embodiments, these additional features can be selected by the customer for display even when the store server 110 has not requested that the customer order entry process be extended.

When step 530 is complete or no extension was requested (step 525), the software adds the selected item to an ordered list, which contains a list of the items order at this point in the customer order entry process. An indication of the ordered items also appears on the LCD/Touch screen 200 for the customer to see. A test is made at step 540 to determine if the customer has completed entering the order. If the order is not complete, control passes back to step 520 where another item selected by the customer in inputted. If the order is complete, the software takes the customer through the payment process, which includes processing the actual payment (step 545). In some embodiments, payment for an order is made an assisted service terminal 130 and this step simply instructs the customer to go to the assisted service terminal 130 to pay. In step 550, the customer's order is sent to a kitchen management terminal 115 to be prepared.

Another test is made to determine if the standard customer order entry process should be extended (step 555). If there is a request to extend the customer order entry process, future specials and promotions are displayed (step 560). In some embodiments, when the wait time becomes excessive, discount coupons for future purchases will be offered to compensate for the long wait times. These can be printed at the terminal 125 or automatically printed with the receipts when the order is fulfilled and delivered. In either case, the customer is informed about the coupons at this point. At step 565, the customer is asked about membership in a loyalty program. If the customer is not a member, he/she is given the opportunity to enroll. If the customer is a member, then he/she is asked to check information in loyalty program about the customer for errors. At step 570, the order entry session is ended and the customer proceeds to the order delivery area.

In some embodiments, the information and promotions used to extend the order entry process includes the use of images and short videos. The images include product photos and the videos include short commercials, current and future product promotion, welcome messages and customer appreciation messages. The welcome messages are played at the start of the session and the appreciation messages are played at the end of the session.

In some embodiments, the extend customer order entry process command includes a delay level. The delay level determines how many additional interactions should be inserted into the standard customer order entry process to extend the process. The store server 110 can change the delay level by sending a new extend customer order entry process command with a different delay level.

Although particular reference has been made to a quick service restaurant, certain other embodiments, variations and modifications are also envisioned within the spirit and scope of the following claims.

I claim:

1. A computer implemented method for controlling a customer order entry process on a self-service terminal, the method comprising:
   receiving an indication by the self-service terminal from a store server that a food preparation rate is slower than a food order rate by a predetermined limit, the indication including an extend order entry process request;
   modifying, in response to receiving the extend order entry process request, the customer order entry process to extend an order entry time where the order entry time is the time required to enter a customer order; and
   entering the customer order where the self-service terminal uses the modified customer order entry process to enter the customer order.

2. The method of claim 1, where modifying the customer order entry process to extend the order entry time includes adding additional interactions with a customer during entry of the customer order or after entry of the customer order is completed and the customer order is transmitted for preparation.

3. The method of claim 2, wherein the additional interactions include providing promotional information to the customer to cross-sell and up-sell other products.

4. The method of claim 2, where the additional interactions include using videos and images.

5. The method of claim 2, where the additional interactions include displaying an introduction video before entering the customer order.

6. The method of claim 2, where the additional interactions include enrolling the customer in a customer loyalty program.

7. The method of claim 2, where the additional interactions include displaying a customer appreciation video after entry of the customer order is completed.

8. The method of claim 1, where the extend order entry process request includes an extend level indicator where the extend level indicator provides a plurality of levels with each level indicating a different modification to the customer order entry process and each modification to the customer order entry process changes the order entry time which changes the time required to enter the customer order.

9. The method of claim 1, further comprising processing payment for the customer order after entry of the customer order is complete.

10. The method of claim 9, further comprising sending the completed customer order to a kitchen management terminal after payment is complete.

11. A self-service terminal comprising:
a housing;
an LCD/Touch Screen device attached to the housing;
a computer comprising:
    a processor;
    a communications device configured to communicate data and commands over a network;
    a memory including software instructions that when executed by the processor cause the processor to control the hardware and implement the features and functions of the self-service terminal including a customer order entry process comprising:
        receiving an indication by the self-service terminal from a store server that a food preparation rate is slower than a food order rate by a predetermined limit, the indication including an extend order entry process request;
        modifying, in response to receiving an extend order entry process request, a customer order entry process to extend an order entry time where the order entry time is the time required to enter a customer order; and
        entering the customer order where the self-service terminal uses the modified customer order entry process to enter the customer order.

12. The terminal of claim 11, where modifying the customer order entry process to extend the order entry time includes adding additional interactions with a customer, during entry of the customer order or after entry of the customer order is completed and transmitted for preparation, using the LCD/Touch screen device.

13. The terminal of claim 12, where the additional interactions include using videos and images.

14. The terminal of claim 12, where the additional interactions include enrolling the customer in a customer loyalty program.

15. The terminal of claim 11, where the extend order entry process request includes an extend level indicator where the extend level indicator provides a plurality of levels with each level indicating a different modification to the customer order entry process and each modification to the customer order entry process changes the order entry time which changes the time required to enter the customer order.

16. A system for controlling the flow of customer, the system comprising:
a network;
a server configured to communicate over the network;
a kitchen management terminal configured to communicate over the network including communicating with the server;
a self-service terminal comprising:
    a housing;
    an LCD/Touch Screen device attached to the housing;
    a computer comprising:
        a processor;
        a communications device configured to communicate data and commands over the network including communicating with the server and kitchen management terminal;
        a memory including software instructions that when executed by the processor cause the processor to control the hardware and implement the features and functions of the self-service terminal including a customer order entry process comprising:
            receiving an extend order entry process request from the server by the self-service terminal;
            modifying, in response to receiving an extend order entry process request, a customer order entry process to extend an order entry time required to enter a customer order; and
            entering the customer order where the self-service terminal uses the modified customer order entry process to enter the customer order;
wherein the server is configured to determine a food preparation rate from the kitchen management terminal and a food order rate from the self-service terminal and is further configured to send the extend order entry process request to the self-service terminal when the food preparation rate is slower than the food order rate by a predetermined limit.

17. The system of claim 16, where modifying the customer order entry process includes adding additional interactions with a customer, during entry of the customer order or after entry of the customer order is completed, using the LCD/Touch screen device.

18. The system of claim 17, where the additional interactions include using videos and images.

19. The system of claim 17, where the additional interactions include enrolling the customer in a customer loyalty program.

20. The system of claim 17, where the extend order entry process request includes an extend level indicator where the extend level indicator provides a plurality of levels with each level indicating a different modification to the customer order entry process to extend the time required to enter the customer order.

21. The system of claim 16, further comprising processing payment for the customer order after entry of the customer order is complete using the server.

22. The system of claim 21, further comprising sending the completed customer order to the kitchen management terminal after payment is complete.

* * * * *